(12) United States Patent
Biskeborn et al.

(10) Patent No.: US 9,792,947 B1
(45) Date of Patent: Oct. 17, 2017

(54) SKIVING BLOCK FOR MITIGATING PROTRUDING DEFECTS FROM MAGNETIC TAPE RECORDING MEDIA

(71) Applicant: International Business Machines Corporation, Armonk, NY (US)

(72) Inventors: Robert G. Biskeborn, Hollister, CA (US); Calvin S. Lo, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/134,268

(22) Filed: Apr. 20, 2016

(51) Int. Cl.
*G11B 15/60* (2006.01)
*G11B 5/008* (2006.01)

(52) U.S. Cl.
CPC ........ *G11B 15/605* (2013.01); *G11B 5/00813* (2013.01)

(58) Field of Classification Search
CPC .... G11B 15/605; G11B 15/60; G11B 5/00813
USPC .............................. 360/130.3, 130.31–130.34
See application file for complete search history.

(56) References Cited

U.S. PATENT DOCUMENTS

| 4,361,860 | A | * | 11/1982 | Nozawa | G11B 5/1272 360/119.07 |
| 5,479,313 | A | | 12/1995 | Haba | |
| 5,950,950 | A | | 9/1999 | Schlatter et al. | |
| 6,796,884 | B1 | | 9/2004 | Tran et al. | |
| 7,086,623 | B2 | * | 8/2006 | Sato | G11B 5/71 242/348.2 |
| 7,369,362 | B2 | | 5/2008 | Lau et al. | |
| 8,027,124 | B2 | * | 9/2011 | Biskeborn | B82Y 10/00 360/119.01 |
| 8,199,430 | B2 | | 6/2012 | Hata et al. | |
| 8,964,319 | B1 | * | 2/2015 | Biskeborn | G11B 5/02 360/27 |
| 9,230,590 | B1 | * | 1/2016 | Biskeborn | G11B 5/48 |
| 9,449,619 | B1 | * | 9/2016 | Biskeborn | G11B 5/00826 |
| 2002/0089784 | A1 | | 7/2002 | Unno | |
| 2003/0151853 | A1 | | 8/2003 | Fahimi et al. | |
| 2005/0122631 | A1 | * | 6/2005 | Biskeborn | G11B 5/39 360/313 |
| 2007/0131811 | A1 | * | 6/2007 | Biskeborn | G11B 15/43 242/334.6 |

(Continued)

FOREIGN PATENT DOCUMENTS

EP 0872829 A1 10/1998

OTHER PUBLICATIONS

Kawakubo et al., "Disk Burnishing for Head Wear Reduction," Asia-Pacific Magnetic Recording Conference, Aug. 16-19, 2004, pp. HD07-01-HD07-02.

*Primary Examiner* — Allen T Cao
(74) *Attorney, Agent, or Firm* — Zilka-Kotab, P.C.

(57) ABSTRACT

An apparatus according to one embodiment includes a block having multiple skiving edges along a tape bearing surface thereof, and a guide mechanism configured to set a wrap angle of a tape approaching the skiving edge. A drive mechanism is configured to cause the tape to move over the block. The block has no transducer coupled directly thereto. A computer-implemented method according to one embodiment includes causing a magnetic recording tape to pass over a block having a skiving edge at a wrap angle of at least one degree for burnishing the tape, wherein the block has an average hardness of at least about 9 Mohs.

20 Claims, 11 Drawing Sheets

(56) References Cited

U.S. PATENT DOCUMENTS

| | | | |
|---|---|---|---|
| 2007/0171573 A1 | 7/2007 | Oyanagi et al. | |
| 2008/0218903 A1* | 9/2008 | Biskeborn | G11B 5/00826 360/129 |
| 2008/0266711 A1* | 10/2008 | Nibarger | G11B 5/00821 360/130.21 |
| 2009/0027812 A1* | 1/2009 | Noguchi | G11B 5/00826 360/324.11 |
| 2012/0300338 A1* | 11/2012 | Biskeborn | G11B 5/00826 360/75 |
| 2014/0240867 A1* | 8/2014 | Holmberg | G11B 5/00813 360/90 |
| 2016/0232936 A1* | 8/2016 | Poorman | G11B 15/60 |
| 2016/0372142 A1* | 12/2016 | Biskeborn | G11B 5/3163 |

* cited by examiner

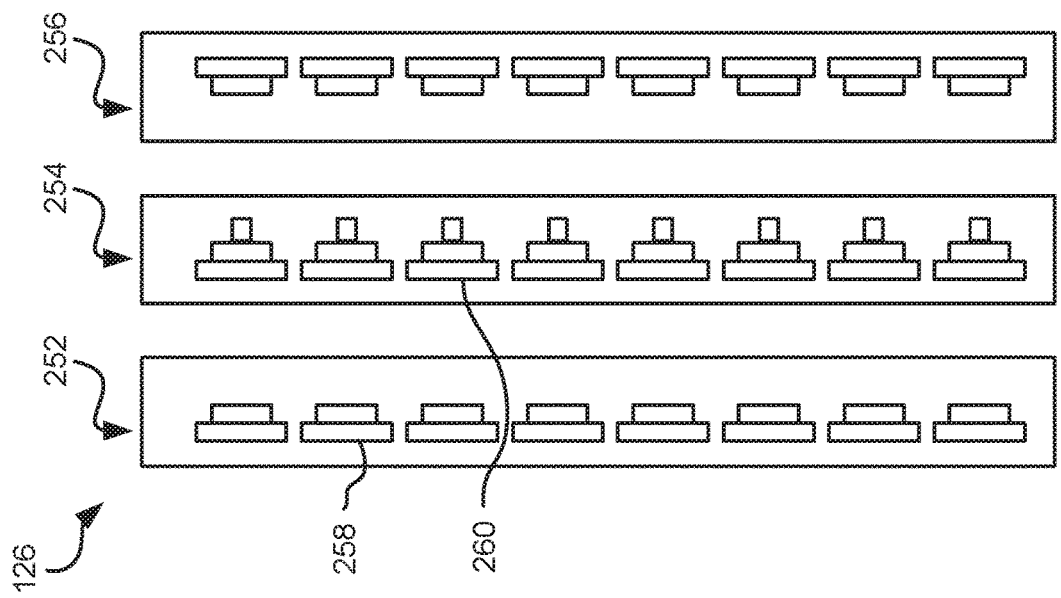
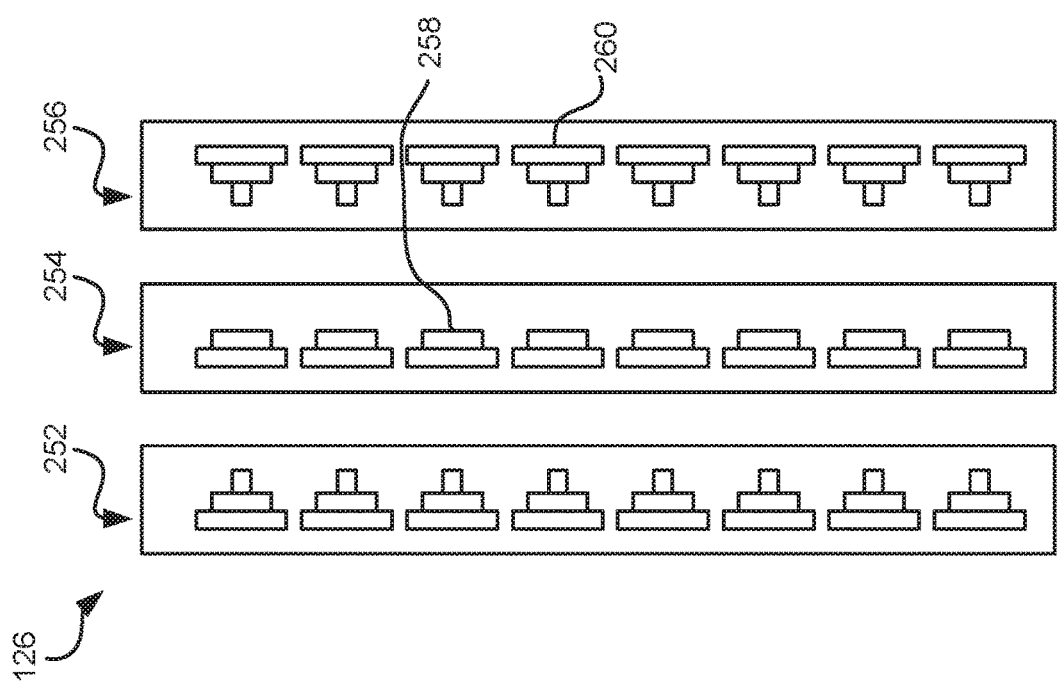

US 9,792,947 B1

SKIVING BLOCK FOR MITIGATING PROTRUDING DEFECTS FROM MAGNETIC TAPE RECORDING MEDIA

BACKGROUND

The present invention relates to data storage systems, and more particularly, this invention relates to mitigating defect abrasivity of magnetic tape recording media.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, the drive moves the magnetic tape over the surface of the tape head at high speed. Usually the tape head is designed to minimize the spacing between the head and the tape. The spacing between the magnetic head and the magnetic tape is crucial and so goals in these systems are to have the recording gaps of the transducers, which are the source of the magnetic recording flux in near contact with the tape to effect writing sharp transitions, and to have the read elements in near contact with the tape to provide effective coupling of the magnetic field from the tape to the read elements.

SUMMARY

An apparatus according to one embodiment includes a block having multiple skiving edges along a tape bearing surface thereof, and a guide mechanism configured to set a wrap angle of a tape approaching the skiving edge. A drive mechanism is configured to cause the tape to move over the block. The block has no transducer coupled directly thereto.

A computer-implemented method according to one embodiment includes causing a magnetic recording tape to pass over a block having a skiving edge at a wrap angle of at least one degree for burnishing the tape, wherein the block has an average hardness of at least about 9 Mohs.

A computer program product for burnishing a magnetic recording tape, according to one embodiment, includes a computer readable storage medium having program instructions embodied therewith, wherein the computer readable storage medium is not a transitory signal per se, the program instructions executable by a processing circuit to cause the processing circuit to perform the foregoing method.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 3 is a partial tape bearing surface view of a magnetic head having a write-read-write configuration.

FIG. 4 is a partial tape bearing surface view of a magnetic head having a read-write-read configuration.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

In one general embodiment, an apparatus includes a block having multiple skiving edges along a tape bearing surface thereof, and a guide mechanism configured to set a wrap angle of a tape approaching the skiving edge. A drive mechanism is configured to cause the tape to move over the block. The block has no transducer coupled directly thereto.

In one general embodiment, a computer-implemented method includes causing a magnetic recording tape to pass over a block having a skiving edge at a wrap angle of at least one degree for burnishing the tape, wherein the block has an average hardness of at least about 9 Mohs.

In one general embodiment, a computer program product for burnishing a magnetic recording tape includes a computer readable storage medium having program instructions embodied therewith, wherein the computer readable storage medium is not a transitory signal per se, the program instructions executable by a processing circuit to cause the processing circuit to perform the foregoing method.

Figure 1A:
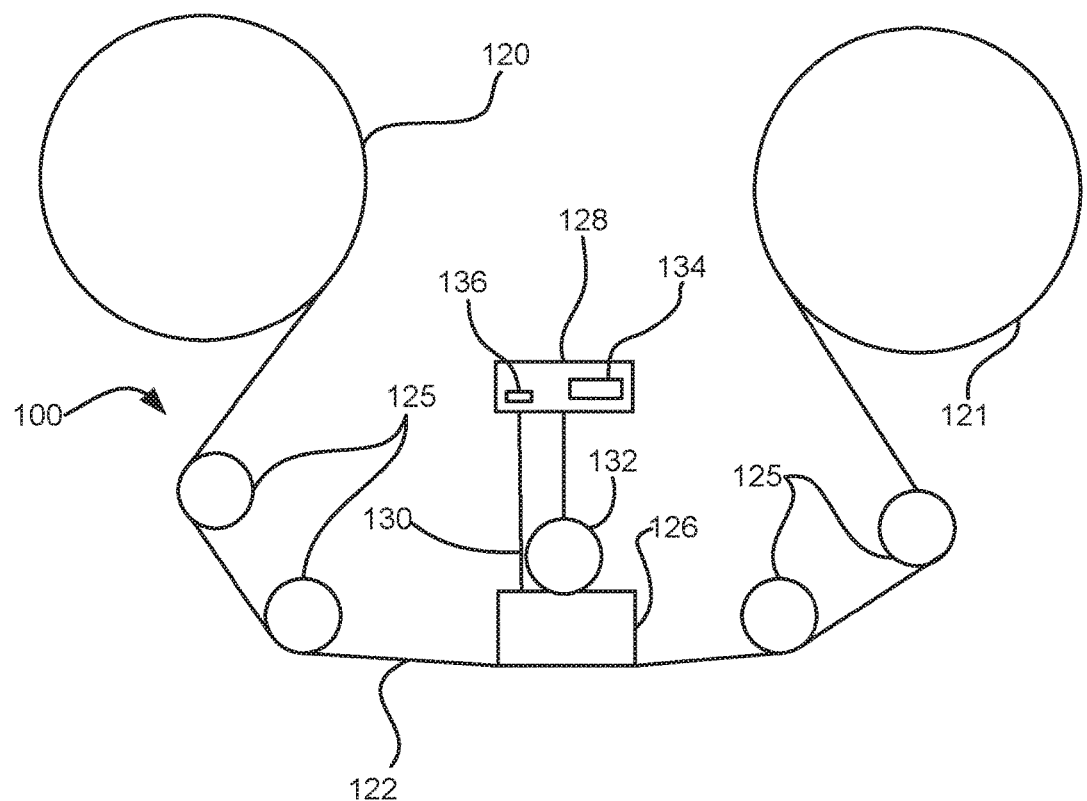
FIG. 1A is a schematic diagram of a simplified tape drive system according to one embodiment.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126 at a desired wrap angle. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
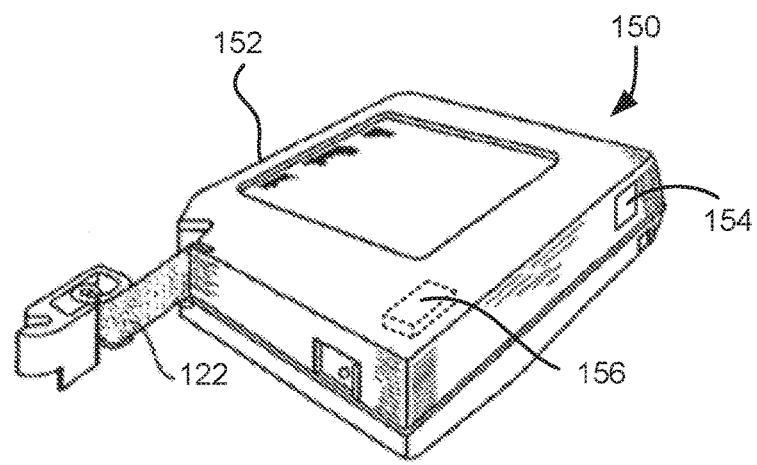
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or other device.

Figure 2:
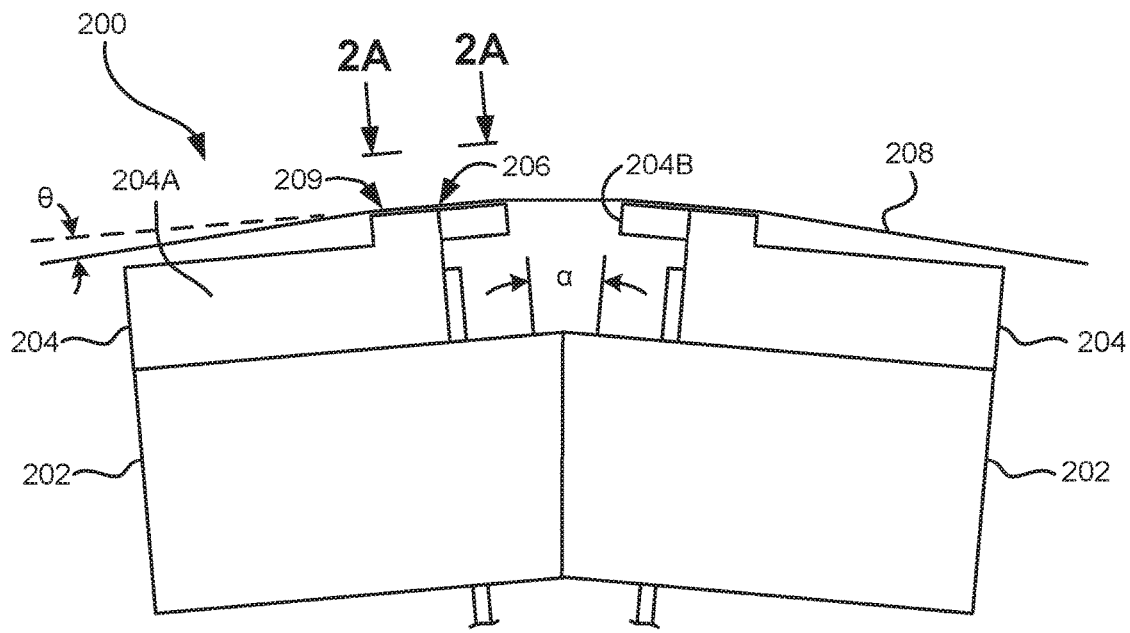
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2A:
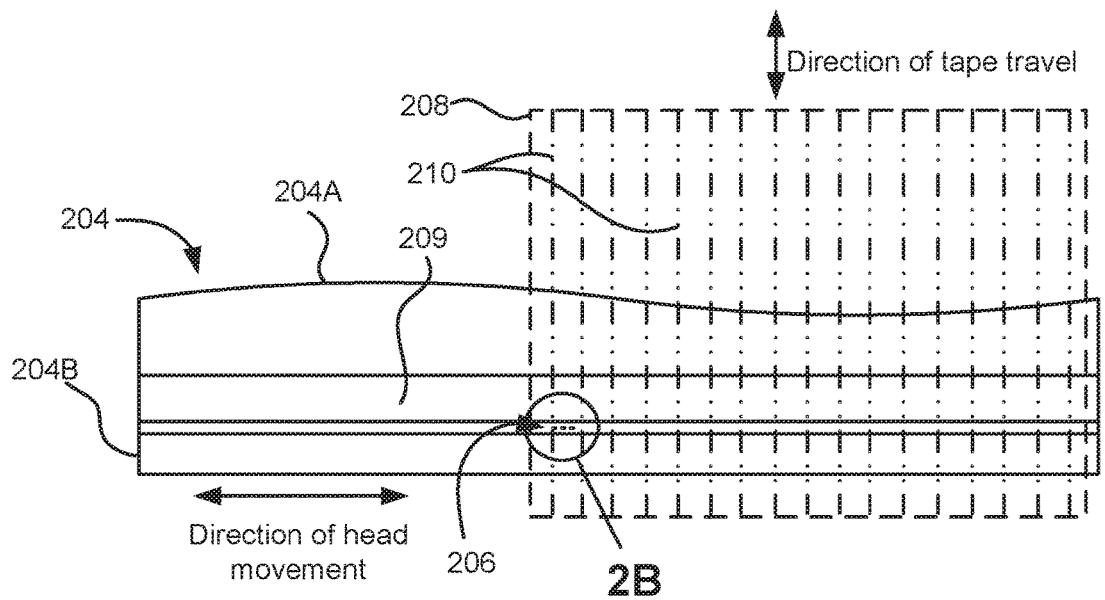
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2A on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
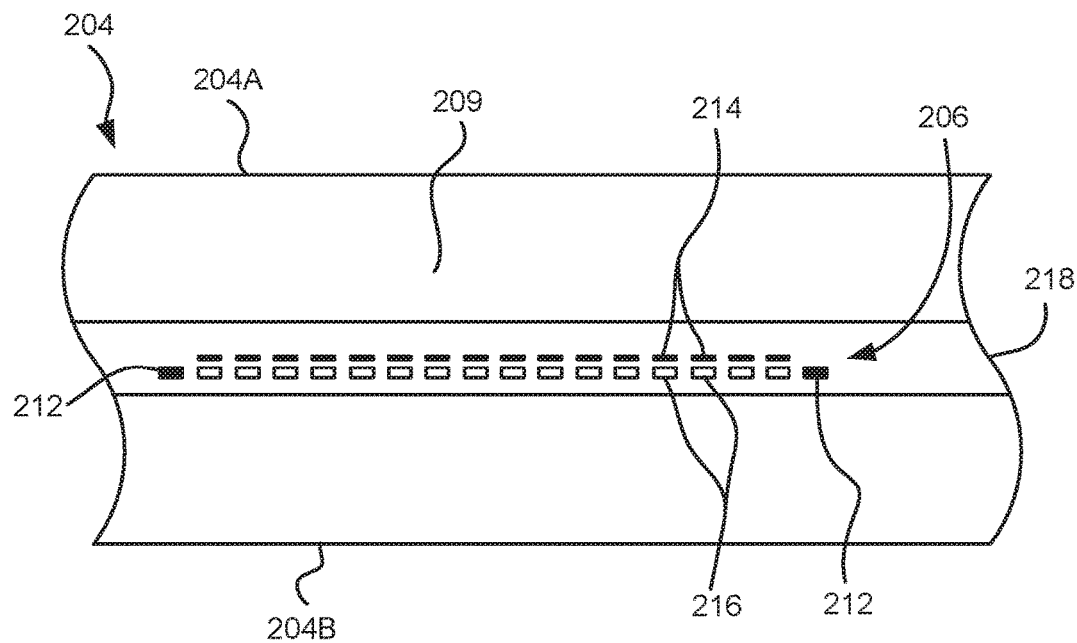
FIG. 2B is a detailed view taken from Circle 2B of FIG. 2A.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
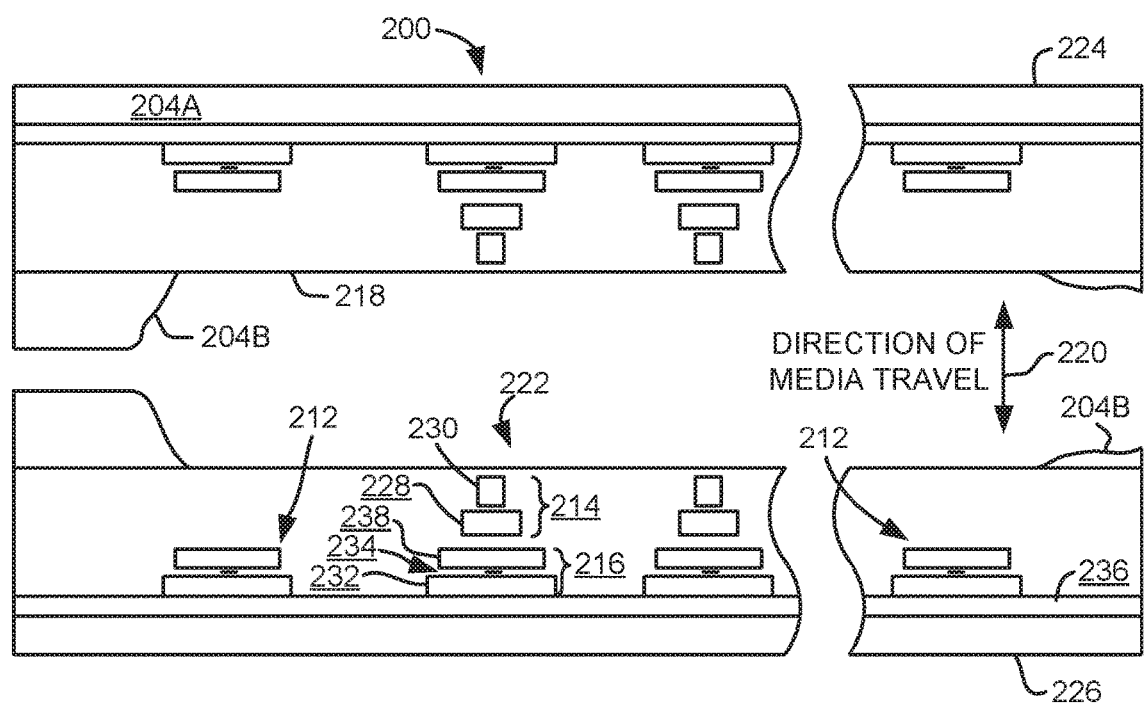
FIG. 2C is a detailed view of a partial tape bearing surface of a pair of modules.

FIG. 2C shows a partial tape bearing surface view of complementary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write transducer 214 and the readers, exemplified by the read transducer 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (-), cobalt zirconium tantalum (CZT) or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
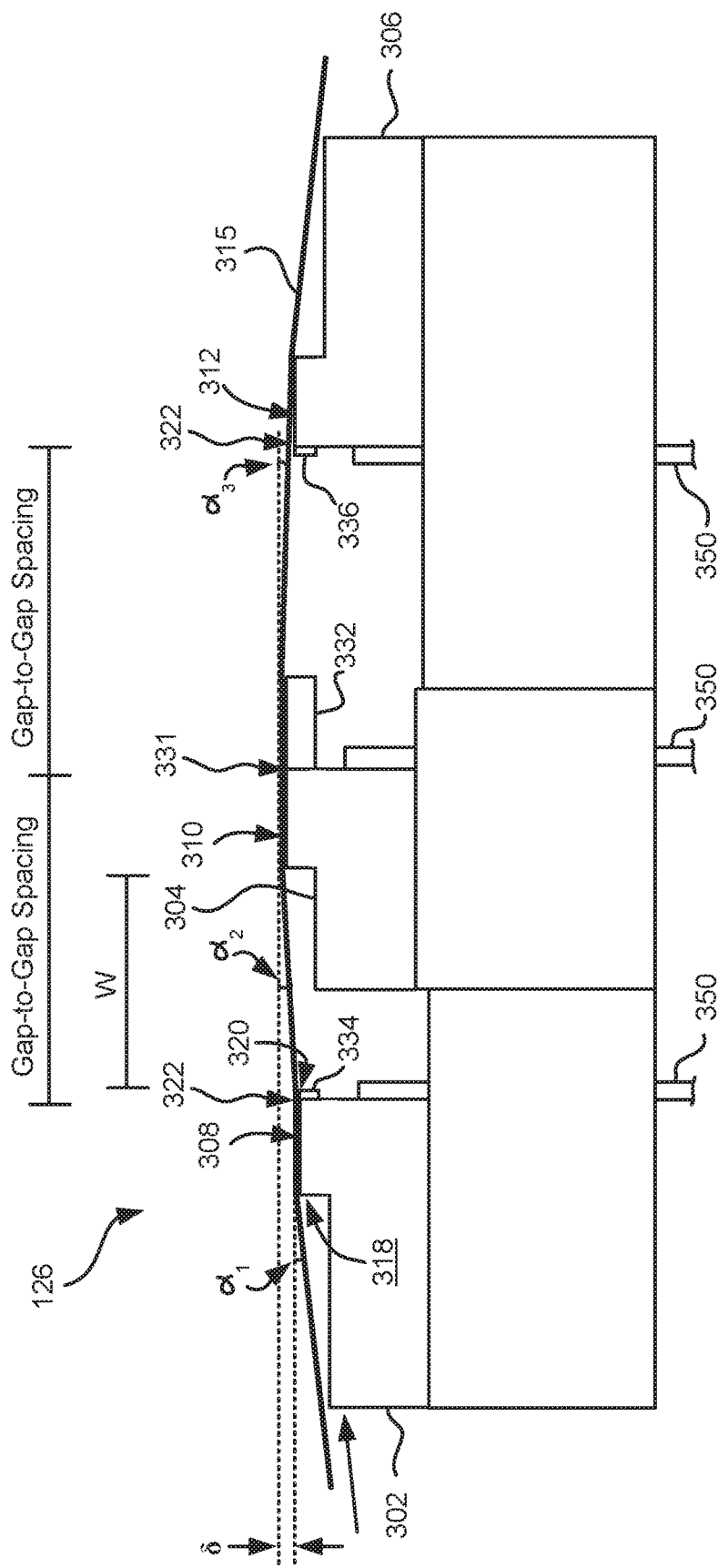
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
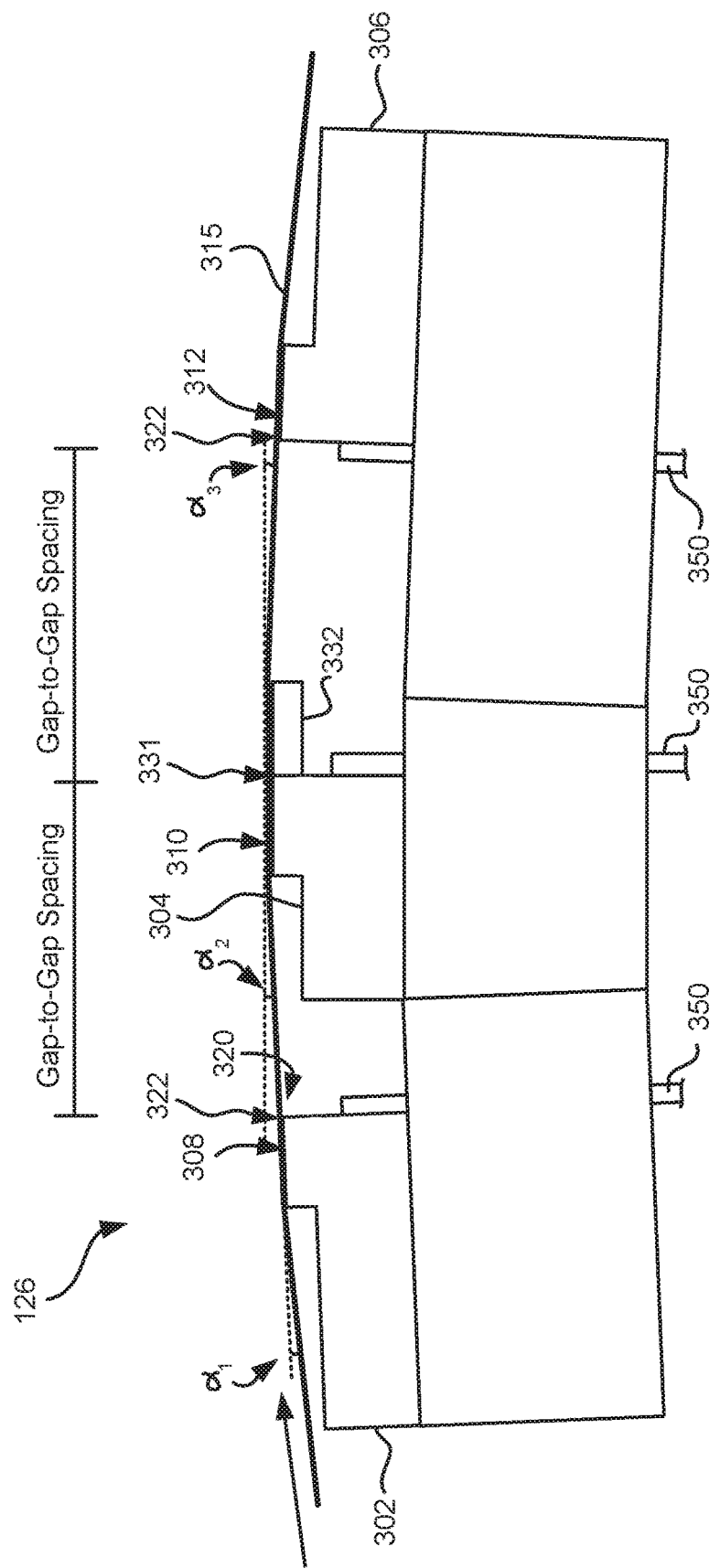
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used LTO tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
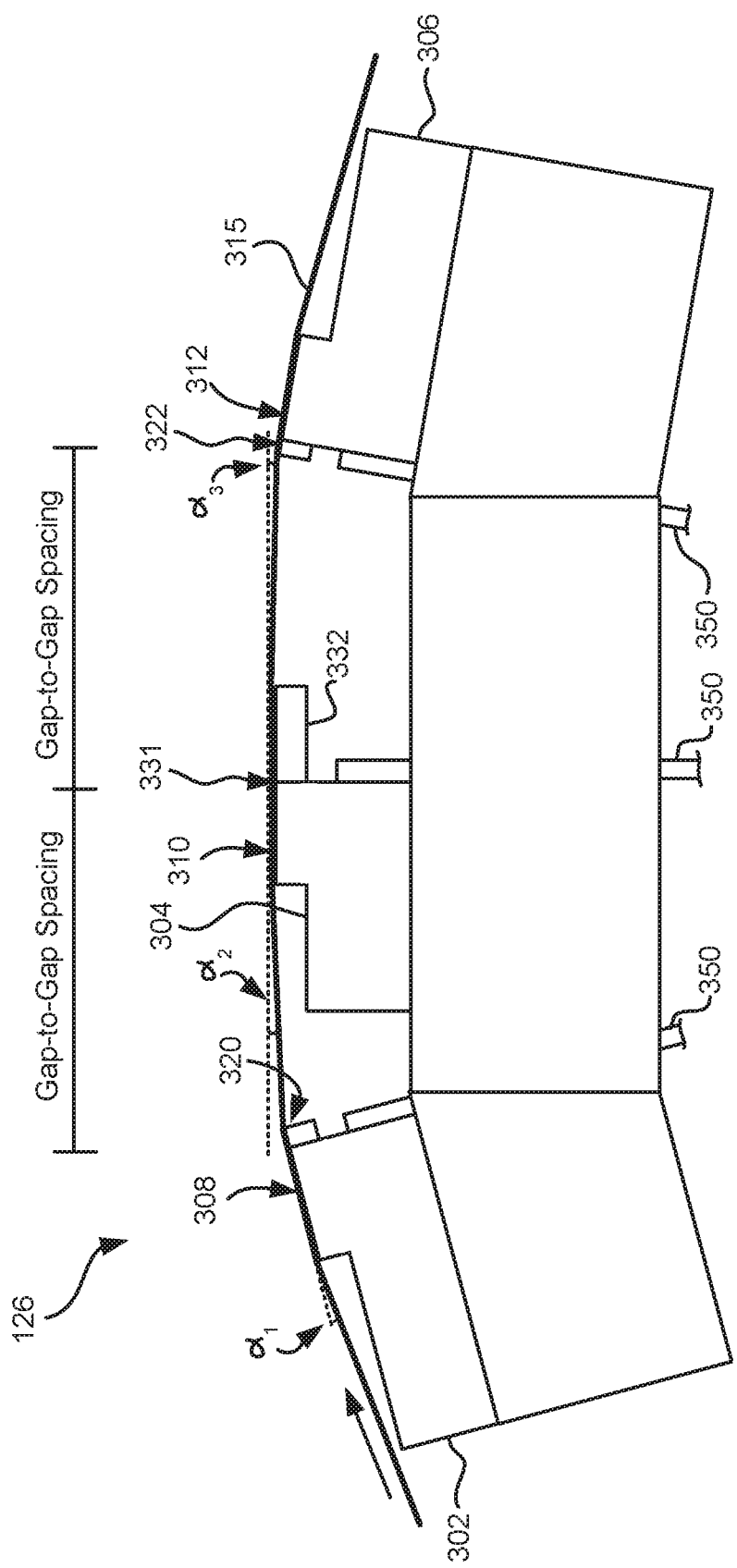
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

Servo pattern and data read sensors may experience shorting failures during normal data writing and/or reading operations. Particularly, such shorting may be caused by protruding defects (herein "surface defects") in the magnetic tape recording media (also generically referred to as "tape"), such as agglomerations of abrasive particles or other defects, e.g., hard particulates, that protrude from the tape surface. Such surface defects may smear and/or plow conductive material from the thin films of the reader across the sensor, thereby creating an electrical short.

While this issue is relevant to current-perpendicular-to-plane (CPP) readers in general, this problem is particularly problematic with CPP TMR sensors. Because the deposition thickness of the tunnel barrier the TMR sensor is very thin, e.g., less than about 10 angstroms in some approaches, smearing of conductive material thereacross is a pervasive problem. Accordingly, TMR sensors may be particularly susceptible to such shorting due to the thin sensor gap.

Interactions between tape media surface defects and a sensor surface may also lead to friction-related functionality issues. For example, when a surface defect passes over a sensor, friction may lead to plastic deformation of one or more delicate thin films of the sensor. Plastic deformation of the delicate thin films may alter the stress distribution inside the sensor, and this may be presented as noise due to magnetic instability, e.g., switching magnetic domains.

Narrower write heads may also be subject to degradation via spacing loss resulting from gouges caused by tape surface defects.

Such problematic surface defects may protrude from the surface of the tape, and may include one or more agglomerations of abrasive particles. The surface defects may also include dense agglomerations of binder materials.

Such surface defects may result from, e.g., the milling of particles used in the tape, e.g., where a large particle is added to the tape media during manufacture; a manufacturing defect during any known manufacturing process, such as creation of an agglomerate of wear particles or binder that protrudes from the media; etc.

Embodiments described herein include implementing a tough, dense, preferably ceramic block with at least one skiving edge positioned along a tape bearing surface thereof in order to mitigate, e.g., via burnishing, tape media defect abrasivity and/or eliminate defect(s) of a tape media altogether.

The block may have one or more skiving edges along a tape bearing surface thereof. Each skiving edge may burnish surface defects in the tape media surface along the tape bearing surface. While a few, loose agglomerations may be broken free during the process, burnishing of the surface defects generally entails reducing the extent of protrusion of the defect.

In a preferred embodiment, the block, or at least the skiving edge of the block, may have a hardness that is at least equal to the hardness of the surface defects in the tape media surface. This ensures that the block is not easily worn away and/or broken in response to coming into contact with a surface defects in the tape media surface.

According to one embodiment, the block may have an average hardness of at least about 9 Mohs. However, the average hardness of the block may vary depending on the embodiment.

According to one embodiment, the block, and most notably the skiving edge(s) of the block, may be preferably harder than the material(s), e.g., that make up the surface defects that may be included in the tape. For example, the block having an average hardness of at least about 9 Mohs would make the block harder than a surface defect of the tape that included barium ferrite and/or alumina particles.

The hardness of different portions of the block may vary depending on the embodiment. For example, the hardness of the skiving edge may be different than the hardness of a portion of the block that does not contact surface defects in the tape media surface along the tape bearing surface.

According to another example, the block may include more than one layer of deposited block material. According to one approach, the hardness of two or more layers of a block that includes more than one layer of deposited block material may be the same, and/or the hardness of two or more layers of the block may be different.

In embodiments where the block includes more than one layer of deposited block material and/or in embodiments where the block includes one block material, the block may be cut and/or polished to desired dimensions. The block may be cut and/or polished to desired dimensions using, e.g., standard ceramics processing, a laser, a diamond or carbide blade, etc.

The block may include one or more materials selected from the following group: aluminum oxide-titanium-carbide (AlTiC), silicon carbide, sapphire, diamond, titanium carbide, boron nitride, zirconium oxide and titanium nitride.

The block may also and/or alternatively include one or more other materials that would be appreciated by one skilled in the art upon reading the present description.

The block may be mounted on a tape head assembly, such as head assembly 200 of FIG. 2, in a tape drive system, such as tape drive system of FIG. 1A.

According to various embodiments, the block may replace a tape head or portion thereof, such as the head in the drive of FIG. 1A. In one approach, the head may be completely replaced with one or more blocks. In another approach, the head may be a hybrid system that includes a block and an active head on a single module.

Figure 8:
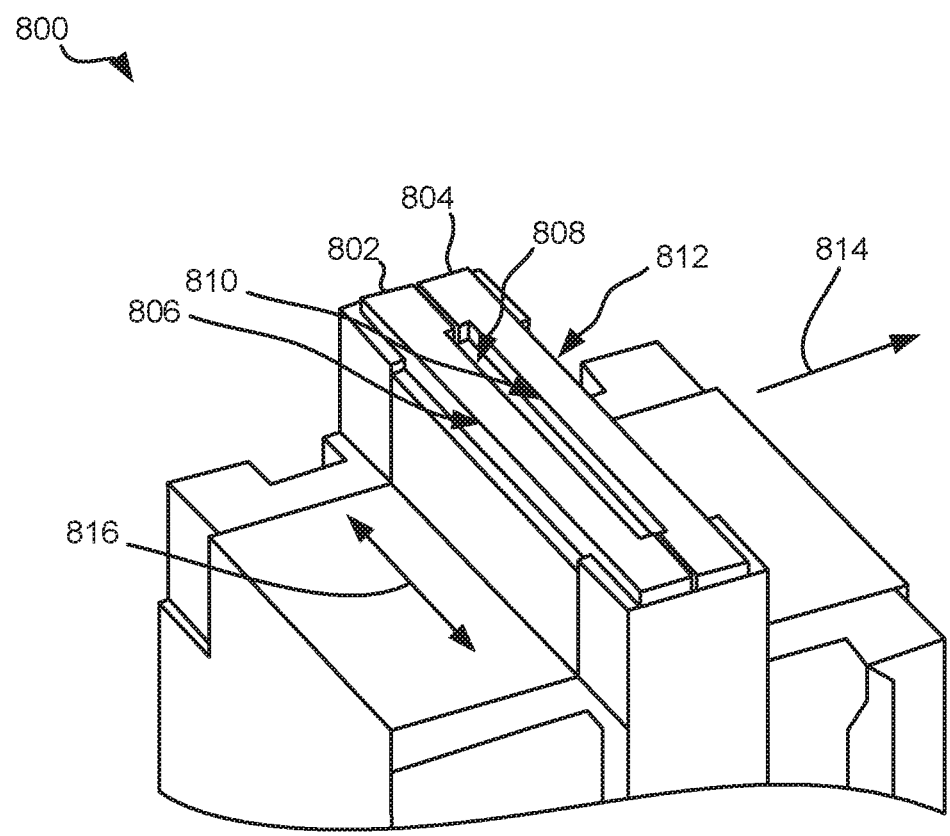
FIG. 8 is a perspective view of a pair of skiving blocks mounted on a simulated head assembly, according to one embodiment.

For purposes of an example, referring now to FIG. 8, a pair of blocks are mounted in a simulated head assembly, as will now be described. FIG. 8 depicts a simulated head assembly 800, in accordance with one embodiment. As an option, the present simulated head assembly 800 may be implemented in conjunction with features from any other embodiment listed herein, such as those described with reference to the other FIGS. Of course, however, such simulated head assembly 800 and others presented herein may be used in various applications and/or in permutations which may or may not be specifically described in the illustrative embodiments listed herein. Further, the simulated head assembly 800 presented herein may be used in any desired environment.

The simulated head assembly 800 includes a first block 802 and a second block 804. The first block 802 and the second block 804 have "u-beam" shaped profiles, but the profile of the blocks 802, 804 and/or other blocks described elsewhere herein should not be interpretively limited thereto.

For example, in one or more different embodiments, the blocks 802, 804 may have, e.g., rectangle profiles, curved profiles, square profiles, etc.

The block 802, 804 may also include any suitable dimensions, and should be wider than the width of the tape media. Other dimensions may vary depending on the embodiment. For example, the dimensions of a block may vary depending on, e.g., the dimensions of the tape of the drive in which the block is implemented, the spatial constraints of a drive in which the block is implemented, the intended mobility of the block, etc.

According to one non-limiting approach, the skiving edge(s) and/or the block(s) may have a width, e.g., that is measured along an axis 816, of at least 22.5 mm, e.g., to span the entire surface of the tape that contacts the block.

According to another non-limiting approach, the blocks 802, 804 may have dimensions which include a 22.5 mm width, a 2.75 mm length (measured in the direction 814), and a 1.75 mm height.

The first block 802 may include a first skiving edge 806 and, optionally, a second skiving edge 808. Similarly the second block 804 may include a first skiving edge 812 and, optionally, a second skiving edge 810. The skiving edges 806, 808, 810, 812 may be configured to burnish surface defects in a magnetic recording tape along a tape bearing surface.

Configuring the skiving edges 806, 808, 810, 812 of the blocks 802, 804 to burnish surface defects in a magnetic recording tape along a tape bearing surface may include, e.g., angling the skiving edges 806, 808, 810, 812 with respect to a wrap angle of a tape approaching the skiving edge, spacing the blocks 802, 804 apart a determined distance, varying the average hardness and/or block material of the blocks 802, 804, etc. as will be described in greater detail elsewhere herein.

The orientation of the skiving edges 806, 808, 810, 812 relative to a particular tape travel direction may be selected based on, e.g., the direction of tape travel, the speed in which the magnetic recording tape is traveling, the material of the blocks 802, 804 and/or the average hardness of the blocks 802, 804, etc.

According to one embodiment where the tape bearing surfaces of the blocks 802, 804 lie along parallel planes, as magnetic recording tape is passed over the blocks 802, 804 in the direction 814, the first skiving edge 806 of the first block burnishes surface defects in the magnetic recording tape. Similarly, as magnetic recording tape is passed over the blocks 802, 804 in a direction substantially opposite direction 814, the first skiving edge 812 of the second block 804 burnishes surface defects in the magnetic recording tape.

According to a preferred embodiment, where the tape bearing surfaces of blocks 802, 804 are angled in an overwrap configuration, e.g., similar to the tape bearing surfaces shown in FIG. 2, as magnetic recording tape is passed over the blocks 802, 804 in the direction 814 shown in FIG. 8, the first skiving edge 806 of the first block 802 and the second skiving edge 810 of the second block 804 burnishes surface defects in the magnetic recording tape. Similarly, as magnetic recording tape is passed over the blocks 802, 804 in a direction substantially opposite direction 814, the second skiving edge 808 of the first block 802 and the first skiving edge 812 of the second block 804 burnishes surface defects in the magnetic recording tape. In a similar manner, more than two blocks may be used to provide even more burnishing effect.

In some approaches, using multiple skiving edges to simultaneously burnish a tape, the wrap angle associated with each skiving edge may be different. Each configuration may provide a differing burnishing effect, which may be useful in dealing with different types of asperities on a given tape. For example, a shallower wrap angle may be more effective at burnishing some types of asperities, while a higher wrap angle may be more effective at burnishing other types of asperities. Moreover, such varying wrap angles may be further used in combination with blocks of differing material types to provide a burnishing system that is effective across a wider range of asperities and/or tape media types. For example, monolithic brittle asperities are more likely to be burnished by the higher shear forces associated with a high wrap angle, whereas agglomerations may be effectively burnished at shallower wrap angles which exert less overall stress on the tape.

The skiving edges 806, 808, 810, 812, located along outer edges of the tape bearing surfaces of the blocks 802, 804, may have substantially ninety degree profiles. The configurations of the skiving edges 806, 808, 810, 812 may vary depending on the embodiment.

It should be noted that the burnishing of surface defects of a tape may include passing the portions of tape that include surface defects over the skiving edges of the blocks any number of times. For example, according to one embodiment, a burnishing sequence may include passing a portion of tape that includes surface defects over a block one time. According to a different embodiment, a burnishing sequence includes passing a portion of tape that includes surface defects over a block more than one time, e.g., two times, three times, four times, etc.

A guide mechanism such as guides in FIG. 1A may be configured to set a wrap angle of a tape approaching the skiving edge of the block. The guide mechanism may include, e.g., tape guides such as guides 125 of FIG. 1A, pitch rollers, a tension arm, etc.

The wrap angle may be set, e.g., by the guide mechanism, to any angle that promotes the burnishing of surface defects off the tape media surface. According to one embodiment, the wrap angle may be at least one degree. According to preferred embodiments, the wrap angle may be in a range of about two to about three degrees.

In general, a wrap angle high than one degree is greater than would be used for conventional read/write operations because the high wrap angle results in higher friction, which is beneficial for burnishing but is not only unnecessary for read/write operations, but excessive friction can lead to deleterious velocity variations of the tape.

The wrap angle may preferably angle the tape media for burnishing rather than removing defects that protrude from the tape surface. Setting a wrap angle for burnishing rather than removing the defects that protrude from the tape surface may prevent undesirable craters from forming in the tape media, e.g., as a result of an entire agglomeration of defect material being ripped out of the tape media surface. Moreover, removal of such agglomerations may create debris within the drive, which can lead to other problems.

Performing a burnishing rather than removal of surface defects may be especially advantageous for tape media(s) that includes "iceberg" profile defects. An iceberg profile surface defect may have a protruding portion that extends out of the surface of the tape, as well as a larger underlying portion that is embedded in the magnetic layer and/or underlayer of a magnetic recording tape. According to one embodiment, the underlying portion of an iceberg profile surface defect of a tape may extend, for example, 750-1250 nm into a tape in the thickness direction and have a similar diameter as measured along the plane of the tape.

It should be noted that the described iceberg profile of a surface defect has been introduced for descriptive purposes only, and should not be interpreted to limit the descriptions of surface defects (described herein) which the block may burnish. The iceberg profile of a surface defect also provides an example of a defect that would likely create an undesirable crater in the tape if removed, rather than burnished by one or more of the blocks described herein.

A drive mechanism such as a motor or other known mechanism may be configured to cause the tape to move over the block. For example, the motor or other known mechanism may drive a tape supply cartridge, e.g., tape supply cartridge 120 of FIG. 1A, and a take-up reel, e.g., take-up reel 121 also of FIG. 1A, of a drive in which the block is implemented in, to move the tape media over the block and/or other components of the drive.

The drive mechanism may cause the tape to move over the block at any speeds that promote burnishing of surface defects off the tape surface.

According to preferred embodiments, the drive mechanism may cause the tape to move over the block at speeds that do not reduce normal throughput of the tape drive. For example, during read operations, the drive mechanism may cause the tape to move over the block at speeds that are normal during read and/or seek operations.

Preferably, the tape tension is maintained at about a constant level when moving the tape over the block. The about constant tape tension may provide a consistent degree of burnishing across the tape media that is passed over and burnished by the block.

In a further embodiment, tape jitter and/or lateral translation of the block relative to the tape may be introduced during a burnishing operation. For example, one or both motors may be manipulated to introduce tape jitter, whereby pulses or the like are introduced via the motors. Lateral translation of the block may be accomplished in a manner similar to actuation of a conventional head during registering the head such as across the various data bands on tape, track following, etc. The lateral translation may be a continuous back and forth motion, performed in steps, combinations thereof, etc. Lateral translation may help prevent formation of scarring on the block.

In some embodiments, the block may have no transducer coupled directly thereto, i.e., that is affixed to or movable with the block.

The block may be implemented in a tape drive apparatus that may or may not have a data head. For example, the tape drive may be a burnishing-only drive.

In further embodiments, the block may be coupled to an active component having active transducers whereby the block and active component together form a single module or larger head. For example, referring again to FIG. 8, one of the blocks may instead be an active component. This configuration is particularly useful for operations such as servo verification, whereby such apparatus burnishes a tape and verifies the servo tracks. Preferably, the block is detachable from the active component.

In other embodiments, a block may be incorporated into a drive that is also capable of reading and/or writing data. In some approaches, the block may be selectively positioned, e.g., in an engaged position, in a retracted position, in a position where the block is accessible by a cleaning device, etc., as will now be described below, e.g., see FIGS. 9-11C.

FIGS. 9-12 depict simplified tape drives 900, 1000, 1100, 1200 of a tape-based data storage system, in accordance with multiple embodiments. As an option, the present tape drives 900, 1000, 1100, 1200 may be implemented in conjunction with features from any other embodiment listed herein, such as those described with reference to the other FIGS. Of course, however, such tape drives 900, 1000, 1100, 1200 and others presented herein may be used in various applications and/or in permutations which may or may not be specifically described in the illustrative embodiments listed herein. Further, the tape drives 900, 1000, 1100, 1200 presented herein may be used in any desired environment.

It should be noted that the tape drives 900, 1000, 1100, 1200 may have a similar configuration and/or one or more similar components to that of the drive 100 of FIG. 1A. Accordingly, the tape drives 900, 1000, 1100, 1200 and the drive 100 may share common numbering.

Figure 9:
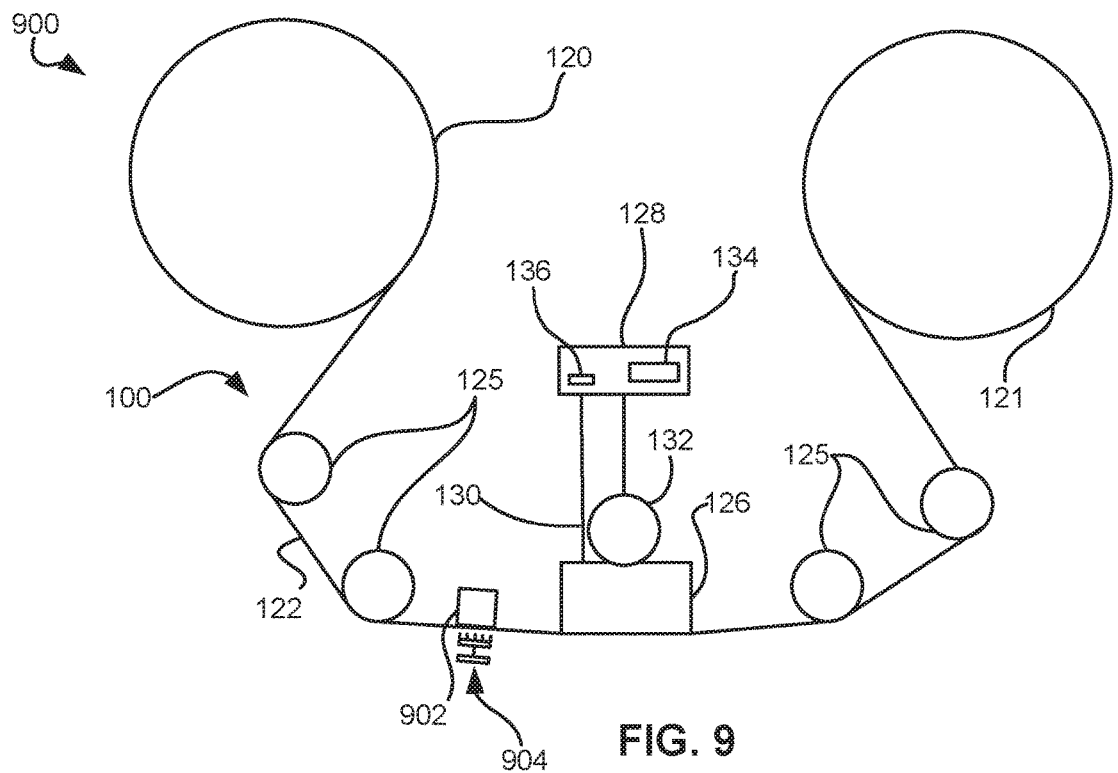
FIG. 9 is a schematic diagram of a simplified tape drive system with a skiving block, according to one embodiment.

Referring now to FIG. 9, tape drive 900 includes a block 902. The block 902 may include one or more blocks, and/or one or more skiving edges, e.g., for burnishing surface defects of the tape 122. The block 902 of tape drive 900 may be positioned in contact with the tape 122, as shown in FIG. 9.

The tape drive 900 may include a cleaning device 904 such as a brush for automated cleaning of the block 902 without removal of the block 902 from the tape drive 900. Automated cleaning of the block 902 without removal of the block 902 from the tape drive 900 may include the cleaning device 904 brushing any loose materials, e.g., that result from the burnishing of the tape, from the block surface and/or any areas around the skiving edge(s) of the block, e.g., such as the gap between the blocks 802, 804 of FIG. 8.

The cleaning of the block 902 is preferably performed during a functional downtime, e.g., while a tape 122 is not being advanced across the block and/or when the block is retracted from the tape path.

According to different embodiments, the cleaning device 904 may alternatively and/or additionally include, e.g., a brush, a fan, a pick, a vacuum, etc.

Figure 11A:
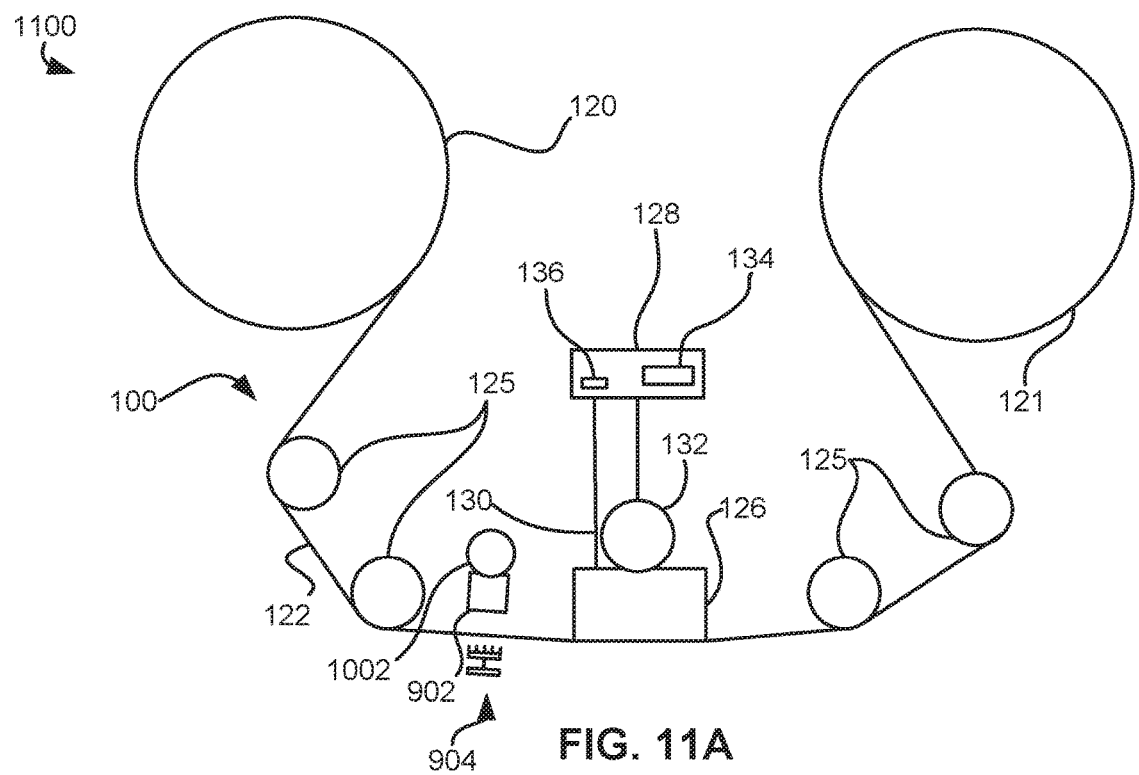
FIG. 11A is a schematic diagram of a simplified tape drive system with a skiving block in a retracted position, according to one embodiment.

The cleaning device may also be positionable to clean the block 902 when the block 902 is in a retracted position, e.g., see FIG. 11A.

The tape drive 900 may include a tape head 126 with at least one transducer. The configuration of the tape head 126 may vary depending on the embodiment, as described elsewhere herein.

Figure 10:
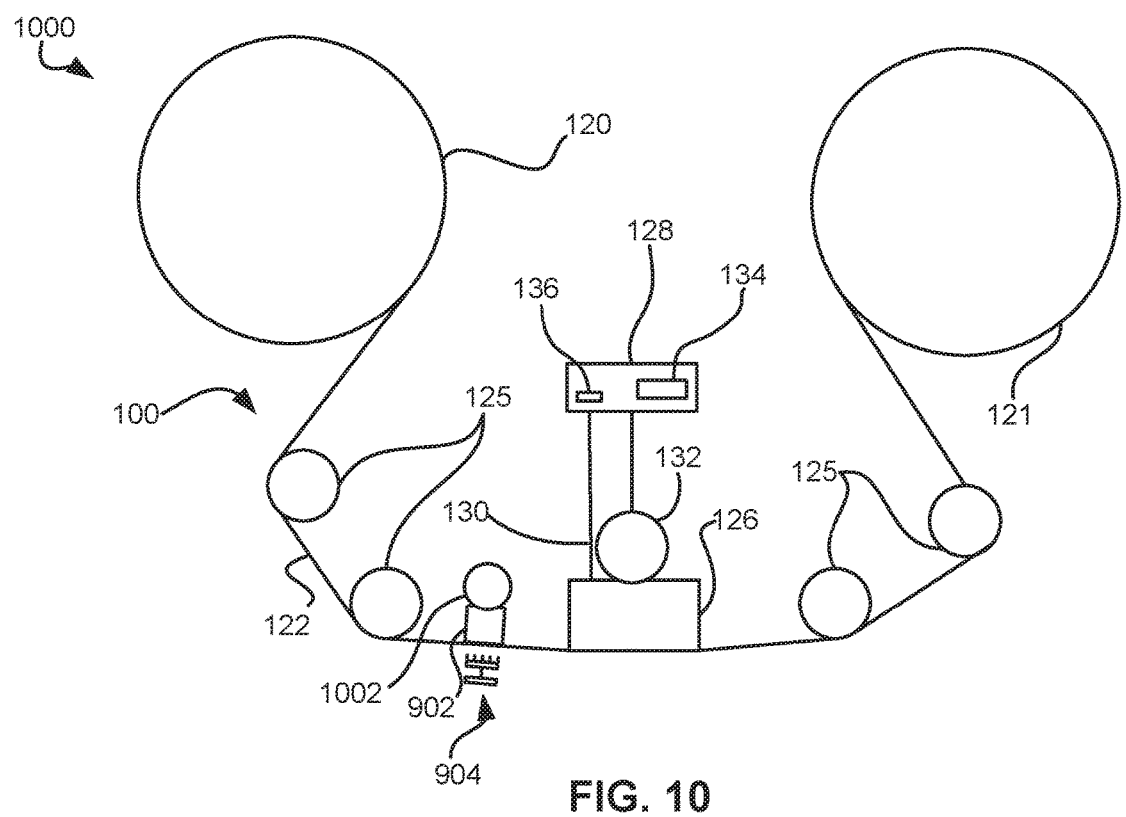
FIG. 10 is a schematic diagram of a simplified tape drive system with a skiving block, according to one embodiment.

Although the block 902 is shown not coupled to an actuator, such as actuator 132 that may be coupled to the tape head 126, the block 902 and/or any of the blocks described herein may be coupled to an actuator, e.g., see FIG. 10.

Referring now to FIG. 10, the tape drive 1000 includes the block 902. The block 902 may be coupled to an actuator 1002. An actuator 1002 may control the position of the block 902 relative to the tape 122. For example, the actuator 1002 may adjust the position of the block 902 relative to the tape 122 to change the wrap angle of the tape approaching the skiving edge of the block.

Figure 11B:
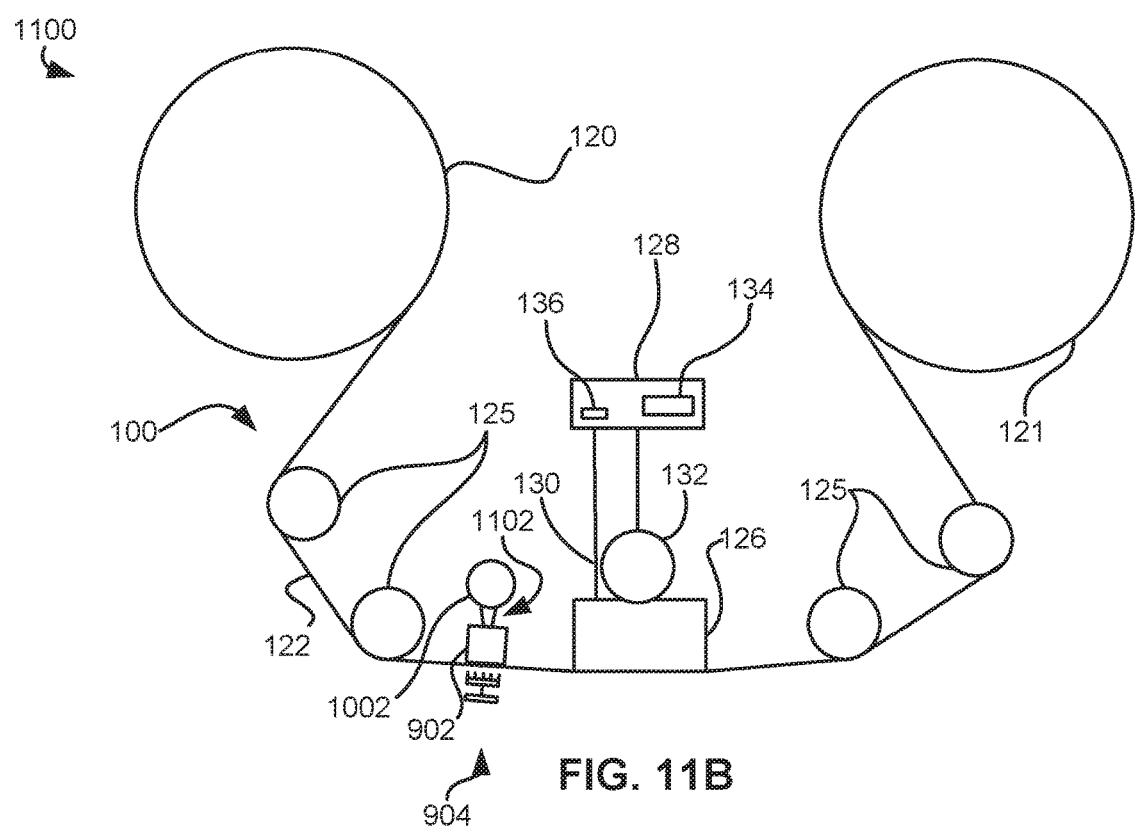
FIG. 11B is a schematic diagram of the simplified tape drive system of FIG. 11A with a skiving block in a burnishing position, according to one embodiment.
Figure 11C:
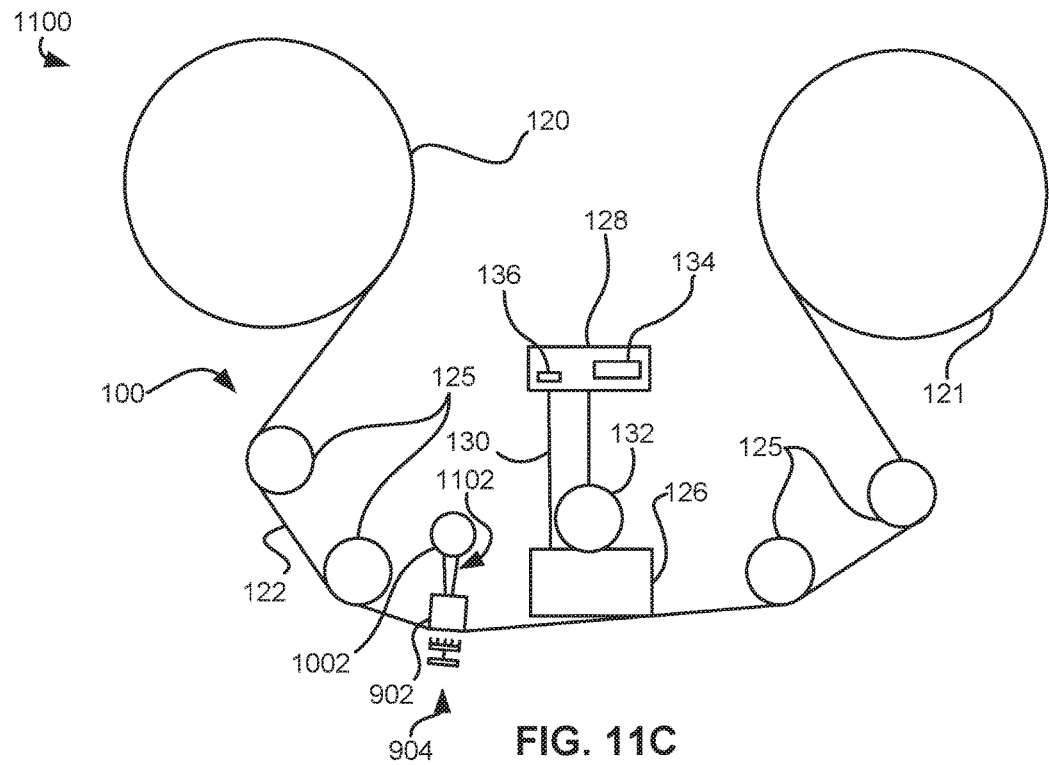
FIG. 11C is a schematic diagram of a simplified tape drive system of FIGS. 11A-11B with a skiving block in a lifting position, according to one embodiment.

The block 902 may be positionable between a burnishing position, e.g., see FIGS. 10, 11B, for engaging the tape 122 and a retracted position, e.g., see FIG. 11A, whereby the skiving edge of the block 902 is not in contact with the tape 122 in the retracted position.

Referring now to FIG. 11A, the tape drive 1100 includes the block 902 which is coupled to the actuator 1002. The block 902 is shown positioned in the retracted position whereby the skiving edge of the block 902 is not in contact with the tape 122.

The block 902 may be positioned in the retracted position in response to burnishing of the tape 122 being undesirable. For example, the block 902 may be positioned in the retracted position in response to, e.g., an instruction from the controller or a host, a trigger condition being met, a user toggling a drive switch, a burnishing already being performed on a portion of tape 122 that is advancing over the block 902, etc.

In contrast, referring now to FIG. 11B, the block 902 is shown positioned in the burnishing position. The block 902 may be positioned in the burnishing position in response to burnishing of the tape 122 being desired. For example, the block 902 may be positioned in the burnishing position in response to, e.g., an instruction from the controller or a host, a trigger condition being met, a user request, a detection that a portion of tape 122 that is advancing past the block 902 includes surface defects, etc. Thus, in some approaches, burnishing may be performed on demand. Note that the head 126 may be retracted from the tape path, if desired, to avoid head wear during the burnishing operation.

According to a different example, the block 902 may be positioned in the burnishing position in response to a tape being added or removed from the drive 1100.

The block 902 may be moved from the retracted position into the burnishing position and/or alternatively from the burnishing position into the retracted position by extending arms 1102. The extending arms 1102 may be coupled to the actuator 1002 and/or the block 902. Equivalent embodiments may implement a worm screw, a linear actuator, etc.

The block 902 may also be positioned to selectively lift the tape 122 from the head 126. For example, referring now to FIG. 11C, the actuator 1002 may position the block 902 past the burnishing position of FIG. 11B, to selectively lift the tape 122 from the head 126.

The block 902 may be positioned to selectively lift the tape 122 from the head 126 for a variety of reasons, such as burnishing the tape; lifting the tape from the head during a high speed tape advancement, e.g., seek operation; decoupling a tape stuck to the head 126 from the head due to stiction; lifting the tape from the head during idle time to prevent stiction, etc.

Lifting the tape 122 from the head 126 during burnishing of the tape 122 may allow for relatively faster rates of burnishing the tape, e.g., in response to the tape 122 being advanced across the block 902 at speeds that exceed discernable read rates. However, the tape may alternatively be burnished at any slower rate, e.g., a discernable read rate, a slower than a discernable read rate, etc. when the tape 122 is lifted from the head 126.

Figure 12:
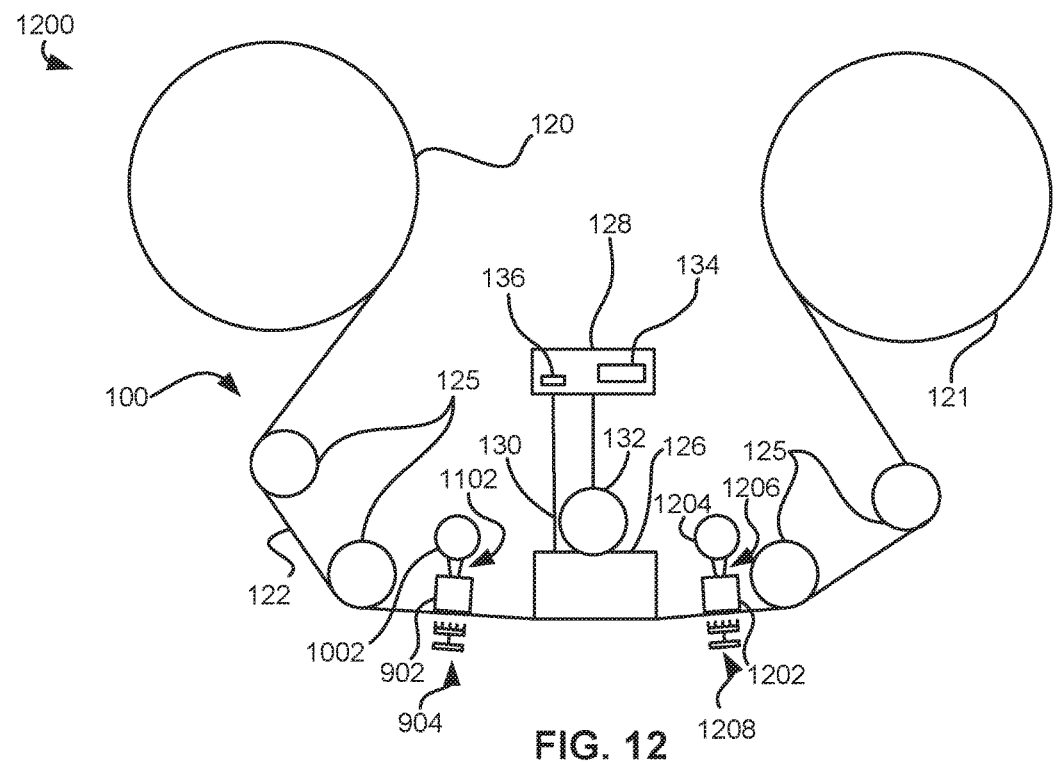
FIG. 12 is a schematic diagram of a simplified tape drive system with two skiving blocks, according to one embodiment.

Referring now to tape drive 1200 of FIG. 12, a servo of the tape 122 may be verified after the burnishing. The verification may be performed in response to a read of one or more servo tracks of the tape 122 being performed by one or more components the head 126.

Servo pattern verification may be performed concurrently with burnishing in a cascading manner. For example, a first tape may be burnished. After burnishing, the tape may be moved to a servo pattern verification drive where the servo pattern is verified. Concurrently, a second tape may be burnished in the drive that just finished burnishing the first tape. Where each tape is to be burnished more than once, a tape may progress through a series of burnishing drives, followed by a final drive that performs the servo pattern verification process. By performing burnishing and servo pattern verification on multiple tapes in parallel, total throughput can be greatly increased.

According to one approach, verification of one or more servo tracks of the tape 122 may include a processor and/or any logic of a controller of the tape drive 1200 verifying a readback signal derived by servo readers of a head reading the servo tracks of the tape. Verifying one or more servos of the tape 122 after burnishing the tape 122 may be performed as a verification measure, e.g., to ensure that one or more of the servo tracks of the tape 122 have not been altered during the burnishing.

In response to detecting one or more altered or otherwise defective servo tracks of the tape 122 during the verifying by one or more servo pattern readers after burnishing, the affected servo tracks may be repaired and/or rewritten. According to one embodiment, the wrap angle of the tape 122 may be adjusted in response to detecting altered servo tracks, e.g., where the alteration is determined to result from burnishing of the tape 122.

With continued reference to the tape drive 1200, the tape 122 may be passed over a skiving edge of a second block 1202 at a wrap angle of at least one degree having the block 902, thereby further burnishing the tape 122. Thus, the effect of multiple burnishing operations may be provided in fewer passes.

In an alternate embodiment, two drive apparatuses may be used to perform sequential burnishing operations. For example, after burnishing the tape in one drive using a first block, the tape may be transferred to a second drive that is different than the first drive and passed over a skiving edge of a second block at a wrap angle of at least one degree in the second apparatus.

Burnishing surface defects from the surface of the tape 122 using more than one block, e.g., blocks 902, 1202, may refine the burnishing performed on the tape 122.

For example, burnishing surface defects from the surface of the tape 122 where the first block 902 has one or more aggressive skiving edge(s), e.g., where the skiving edges burnish the tape 122 at a wrap angle substantially greater than one degree, and the second block 1202 has one or more non-aggressive skiving edge(s), e.g., where the skiving edges burnish the tape 122 at a wrap angle substantially close to one degree, or alternatively vice versa, may promote a consistent burnishing of the tape 122, regardless of the size of the surface defect being burnished.

Using more than one block when burnishing surface defects of the tape 122, e.g., blocks 902, 1202, may also reduce the degree of wear that the skiving edges of each of the more than one blocks experience from the burnishing.

It should be noted that blocks that experience wear as a result of the burnishing may be easily replaced and/or repaired. In order to easily replace the blocks in the drives described herein, the blocks may preferably be configured to be easily detached from the drive in which they are implemented. For example, the blocks may be attached in the drives using one or more, e.g., clips, screws, clamps, etc. Repairs may be made by machining along the skiving edge(s).

The tape drive 1200 may also include an actuator 1204 that controls the position of the second block 1202 relative to the tape 122.

Similar to the first block 902, the second block 1202 may be positionable between a retracted position and a burnishing position and/or alternatively from the burnishing position into the retracted position by extending arms 1206 or equivalent structure.

The tape drive 1200 may also include a second cleaning device 1208, e.g., for cleaning the second block 1202.

The blocks 902, 1202 of the tape drive 1200 may be configured to burnish different types of surface defects in the tape 122. For example, in addition and/or alternatively to the potential for the first block 902 and the second block 1202 to burnish the tape at different wrap angles as described elsewhere herein, the blocks 902, 1202 may include different materials, e.g., that are each conducive to burnishing different types of surface defects.

It should be noted that tape drives that include more than one block should not be interpretively limited to including a maximum of two blocks. Rather, tape drives that include more than one block should be interpreted to be capable of including any practical number of burnishing blocks, where each of the multiple blocks may be positioned and/or include materials that promote the burnishing of different surface defects, e.g., defects that differ in size from one another, defects that differ in material from one another, defects that differ in the degree to which they are bound in the tape medium, etc.

In a different embodiment the blocks described herein may be incorporated into a simulated head structure which may replace a magnetic head assembly in a tape drive, e.g., drives 100, 900-1200. One notable advantage of such an embodiment is that the simulated head may be cleaned in the same manner as the data head might otherwise be, e.g., by automatic brushing in the drive.

The burnishing described herein may be performed using a computer-implemented, e.g., controller-implemented, method. The method may include causing the magnetic recording tape to pass over the block having a skiving edge.

In one embodiment, a tape that is to be burnished may be loaded into a drive, and firmware may cause motion of the tape, where the tape may pass over the simulated head structure (block), preferably at constant tension and speed. The cartridge housing the tape may be loaded by an autoloader, before and/or after one or more burnishing operations, may automatically be loaded into a servo verification drive. In such an embodiment, as described elsewhere herein, the tape may approach the skiving edge at a wrap angle of at least one degree for burnishing the tape.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. An apparatus, comprising:
a block having multiple skiving edges along a tape bearing surface thereof;
a guide mechanism configured to set a wrap angle of a tape approaching the skiving edge; and
a drive mechanism configured to cause the tape to move over the block,
wherein the block has no transducer coupled directly thereto.

2. An apparatus as recited in claim 1, wherein the wrap angle is at least one degree.

3. An apparatus as recited in claim 1, wherein the block has an average hardness of at least about 9 Mohs.

4. An apparatus as recited in claim 1, wherein the block comprises at least one material selected from a group consisting of: AlTiC, silicon carbide, sapphire, diamond, titanium carbide, boron nitride, zirconium oxide and titanium nitride.

5. An apparatus as recited in claim 1, wherein the drive mechanism is configured to maintain about a constant tape tension when moving the tape over the block.

6. An apparatus as recited in claim 1, comprising a cleaning device for cleaning the block without removal of the block from the apparatus.

7. An apparatus as recited in claim 1, wherein the block is positionable between a burnishing position for engaging the tape and a retracted position whereby the skiving edge of the block is not in contact with the tape.

8. An apparatus as recited in claim 1, comprising a head with at least one transducer.

9. An apparatus as recited in claim 8, wherein the block is positioned to selectively lift the tape from the head.

10. A computer-implemented method, comprising:
causing a magnetic recording tape to pass over a block having a skiving edge at a wrap angle of at least one degree for burnishing the tape, wherein the block has an average hardness of at least about 9 Mohs.

11. A method as recited in claim 10, wherein the block comprises at least one of silicon carbide, sapphire, diamond, titanium carbide, boron nitride, zirconium oxide and titanium nitride.

12. A method as recited in claim 10, comprising maintaining about a constant tape tension when moving the tape over the block.

13. A method as recited in claim 10, comprising causing cleaning of the block without removal of the block.

14. A method as recited in claim 10, comprising causing the block to move between a burnishing position for engaging the tape and a retracted position whereby the skiving edge of the block is not in contact with the tape.

15. A method as recited in claim 10, comprising causing the block to lift the tape from a head having at least one transducer.

16. A method as recited in claim 10, comprising verifying a servo pattern of the tape after the burnishing.

17. A method as recited in claim 16, wherein the burnishing of the tape is performed by a first apparatus and the verifying of the servo pattern of the tape is performed by a second apparatus, and further comprising burnishing a second tape using the first apparatus simultaneously with the verifying using the second apparatus.

18. A method as recited in claim 17, comprising burnishing a third tape in a third apparatus concurrently with the verifying of the servo pattern of the tape using the second apparatus and the burnishing of the second tape using the first apparatus.

19. A method as recited in claim 10, comprising, after burnishing the tape, causing the tape to pass over a skiving edge of a second block at a wrap angle of at least one degree in a second apparatus different than a first apparatus having the block, thereby further burnishing the tape.

20. A computer program product for burnishing a magnetic recording tape, the computer program product comprising a computer readable storage medium having program instructions embodied therewith, wherein the computer readable storage medium is not a transitory signal per se, the program instructions executable by a processing circuit to cause the processing circuit to perform a method comprising:
causing a magnetic recording tape to pass over a block having a skiving edge at a wrap angle of at least one degree for burnishing the tape, wherein the block has an average hardness of at least about 9 Mohs.

* * * * *